(12) United States Patent
Mahajan et al.

(10) Patent No.: US 7,746,531 B2
(45) Date of Patent: Jun. 29, 2010

(54) ELECTRO-OPTOMECHANICAL BEAM STEERING SYSTEM, AND ASSOCIATED METHODS

(75) Inventors: Milind P. Mahajan, Thousand Oaks, CA (US); Bruce K Winker, Ventura, CA (US)

(73) Assignee: Teledyne Scientific & Imaging, Inc., Thousand Oaks, CA (US)

( * ) Notice: Subject to any disclaimer, the term of this patent is extended or adjusted under 35 U.S.C. 154(b) by 389 days.

(21) Appl. No.: 11/238,262

(22) Filed: Sep. 29, 2005

(65) Prior Publication Data
US 2007/0070480 A1    Mar. 29, 2007

(51) Int. Cl.
  *G02F 1/03* (2006.01)
  *G02B 27/64* (2006.01)
  *G02B 27/14* (2006.01)
  *H01S 3/08* (2006.01)

(52) U.S. Cl. .............. 359/245; 359/554; 359/638; 372/101

(58) Field of Classification Search .......... 359/223, 359/245–246, 251, 298, 301, 554, 619, 637–638; 372/33, 101
See application file for complete search history.

(56) References Cited

U.S. PATENT DOCUMENTS

| 5,481,394 A | * | 1/1996 | Kimura | 359/234 |
| 5,825,545 A | * | 10/1998 | Kino et al. | 359/557 |
| 5,946,116 A | * | 8/1999 | Wu et al. | 398/55 |
| 6,636,664 B2 | * | 10/2003 | Snyder et al. | 385/36 |
| 6,792,028 B2 | * | 9/2004 | Cook et al. | 372/102 |

* cited by examiner

*Primary Examiner*—Scott J Sugarman
*Assistant Examiner*—Dawayne A Pinkney
(74) *Attorney, Agent, or Firm*—Glenn H. Lenzen; Polsinelli Shughart PC

(57) ABSTRACT

An electro-optomechanical beam steering system has: a first deflector for selectively deflecting an optical beam in a first field of regard centered about a boresight; and a rotation stage having a second deflector, the rotation stage selectively positioning the second deflector in azimuth about the boresight, the second deflector selectively deflecting the optical beam of the first field of regard in a second field of regard along a polar axis defined by the second deflector and the azimuth as positioned by the rotation stage. Methods using the beam steering system are also provided, to steer an optical beam or to acquire a target in a field of regard.

35 Claims, 6 Drawing Sheets

ELECTRO-OPTOMECHANICAL BEAM STEERING SYSTEM, AND ASSOCIATED METHODS

BACKGROUND

The prior art is familiar with devices that steer an optical beam, e.g., a laser. Such devices are known to include, for example, electro-optical devices and opto-mechanical devices that manipulate mirrors and prisms.

Prior art optical beam steering devices are also known to exhibit certain problems. A major one of these problems is that current opto-mechanical beam steering devices are not sufficiently agile, compact and temporally responsive to the needs of current laser radar, targeting and communication applications. Another problem is that electro-optical devices do not provide sufficiently large field of regard without compromising optical efficiency.

SUMMARY

In an embodiment, an electro-optomechanical beam steering system has: a first deflector for selectively deflecting an optical beam in a first field of regard centered about a boresight; and a rotation stage having a second deflector, the rotation stage selectively positioning the second deflector in azimuth about the boresight, the second deflector selectively deflecting the optical beam of the first field of regard in a second field of regard along a polar angle defined by the deflection of the second deflector and the azimuthal angle as positioned by the rotation stage.

In an embodiment, a method steers an optical beam, including: applying first control signals to a first deflector, to selectively deflect an optical beam within a first field of regard centered about a boresight; rotating a second deflector about the boresight; and applying second electrical signals to the second deflector, to selectively deflect the optical beam of the first field of regard within a second field of regard in a direction, away from boresight, defined by polar deflection of the second deflector and azimuthal rotation of the motor.

In an embodiment, a software product has instructions, stored on computer-readable media, wherein the instructions, when executed by a computer, perform steps for steering an optical beam, including: instructions for applying first control signals to a first deflector, thereby deflecting the optical beam within a first field of regard centered about a boresight; instructions for commanding a motor to rotate a second deflector, thereby selectively repositioning the deflected optical beam of the first field of regard in azimuth; and instructions for applying second control signals to the second deflector, thereby selectively deflecting the optical beam of the first field of regard away from boresight and within a second field of regard centered about boresight.

In an embodiment, apparatus for maintaining alignment of linear polarization includes: a first stage having at least one element sensitive to linear polarization; a second stage having at least one element sensitive to linear polarization and being rotatable independent of the first stage; at least one of the first and second stages having at least one tunable retarder; at least one of the first and second stages having at least one quarter wave plate; wherein linear polarization of electro-magnetic energy transmitted through the stages maintains alignment while the second stage rotates.

DETAILED DESCRIPTION OF THE FIGURES

Figure 1:
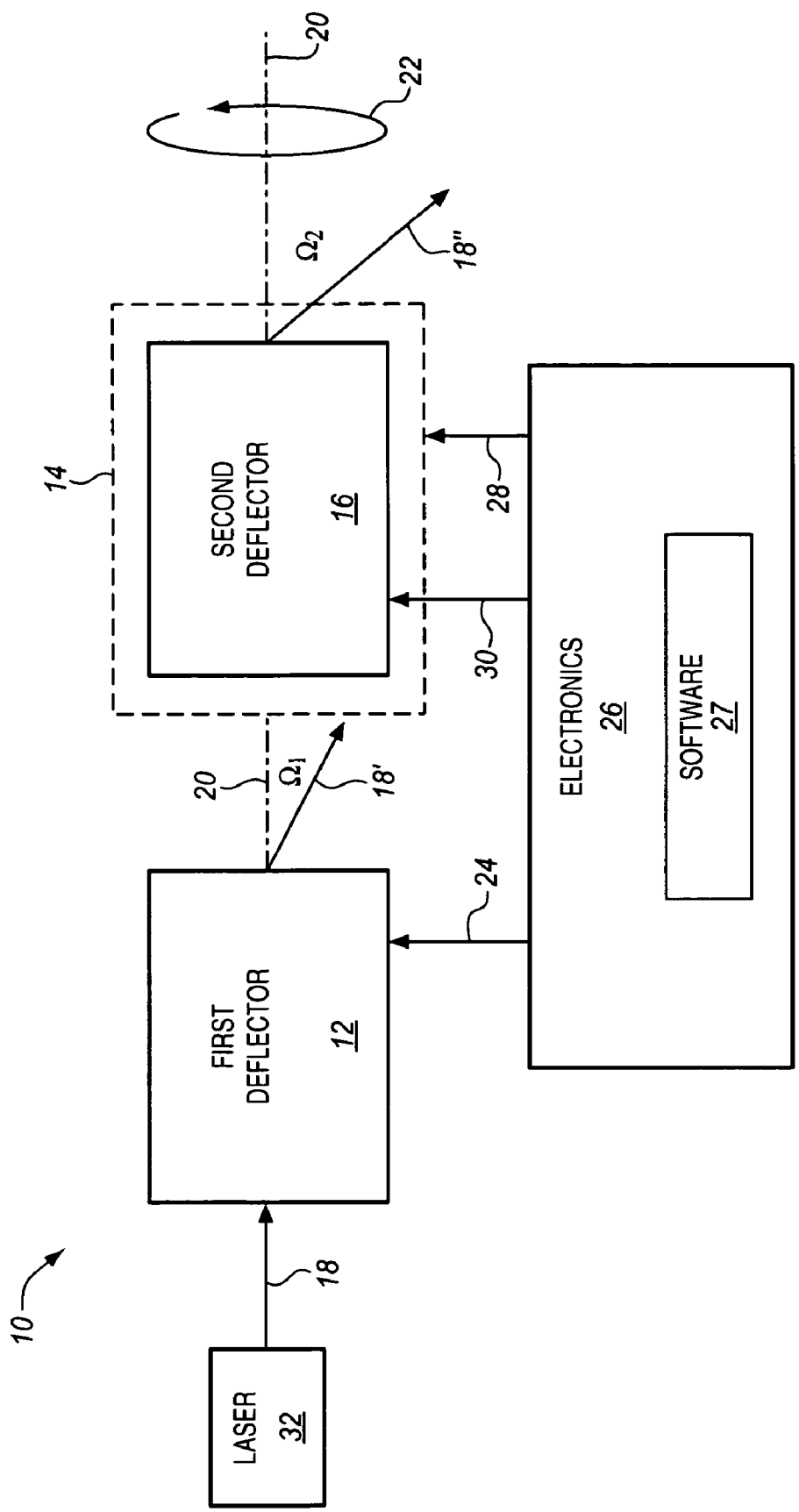
FIG. 1 shows one electro-optomechanical beam steering system.

FIG. 1 shows one electro-optomechanical beam steering system 10. System 10 has a first deflector 12, a rotational stage 14, and a second deflector 16. First deflector operates to deflect an optical beam 18 in a first field of regard $\Omega_1$ centered about a boresight 20 (which may also coalign with an optical axis of beam 18). Rotation stage 14 operates to rotate second deflector 16 in azimuth, illustrated by arrow 22, about boresight 20. Second deflector 16 operates to deflect optical beam 18' of the first field of regard in a second field of regard $\Omega_2$. This deflection is defined by a polar angle set by second deflector 16 and the azimuthal angle as positioned by rotation stage 14. Illustratively, optical beam 18 as deflected by first deflector 12 is shown as optical beam 18', and as deflected by second deflector 16 is shown as optical beam 18".

As described in more detail below, first deflector 12 may include multiple electro-optic stages, each stage having a birefringent prism and a tunable liquid crystal polarization rotator (TLR). These stages are responsive to applied control signals 24 such as supplied by associated electronics 26. In this manner, therefore, a user of system 10 may selectively control electronics 26 to apply control signals 24 to first deflector 12 and thereby selectively steer optical beam 18' to a desired position within first field of regard $\Omega_1$. As described more fully below, field of regard $\Omega_1$ may be obtained by two one-dimensional electro-optic stages that deflect the beam in x and y (see FIG. 3).

A TLR is a liquid crystal layer sandwiched between two glass plates, coated inside with a transparent conductor and a liquid crystal alignment layer. The liquid crystal optic axis is aligned in a direction forty-five degrees to input polarization. Applying electric field to the transparent conductors controls the retardation of the liquid crystal. If the retardation is zero or an integer multiple of $2\pi$ (0, $2\pi$, $4\pi$, etc.), the output polarization remains unchanged. If the retardation is half-integer multiple of $2\pi$ (e.g. $\pi$, $3\pi$, $5\pi$, etc.), then the polarization rotates by 90 degree. These are the two polarization states (zero or 90 degrees rotation) used in the birefringent prism deflector. A TLR may be switched between these two states by application of an electric field. Further a TLR may be voltage-tuned for optimized performance at any incidence angle. The birefringent prism deflector is for example either a Wollaston or Rochon prism that deflects the beam in one of the two possible directions based on the input polarization. If a TLR is used to control the polarization incident on the prism, we then control the resulting deflection angle after the beam exits the prism. Thus a TLR and one or more birefringent prisms together form a single deflection stage, such described more fully below. These stages are stacked in a binary fashion to build large angle discrete angle deflectors.

Rotation stage 14 is for example a motor (e.g., ring motor); it too may be configured to respond to control signals (e.g., signals 28) from electronics 26. In this way the user of system 10 can selectively control electronics 26 to rotate second deflector 16 to a desired azimuth position, from zero to three hundred sixty degrees.

It is interesting to note that the load on the motor is axial, around its axis of rotation, and not about some other point, such as in many gimbal systems. Gimbal systems in particular have a larger moment arm and thus have a slower response time, as compared to system 10. This architecture may further overcome the keyhole obscuration (not being able to point in a region near boresight) or dynamic problems (with a similar result of not being able to point in a region near boresight).

As further discussed below, second deflector 12 may also include multiple electro-optic stages, each stage having a birefringent prism and a TLR. These stages are also responsive to applied control signals (e.g., shown as signals 30) such as supplied by electronics 26. Thus a user of system 10 may selectively control electronics 26 to apply control signals 30 to second deflector 12 and thereby selectively deflect optical beam 18' of first field of regard $\Omega_1$ within second field of regard $\Omega_2$. As described more fully below, second field of regard $\Omega_2$ may be obtained by two polar angle electro-optic stages that deflect the beam in polar axes; while the azimuth is defined by positioning of rotation stage 14 (see FIG. 3).

Collectively, applied control signals (e.g., signals 24, 28, 30) to system 10 provide for selective steering of optical beam 18 from its original direction along boresight 20, to its intermediate direction shown by optical beam 18', to its final direction shown by optical beam 18". Altering these signals thus alters the final direction of beam 18" so that a large field of regard (FOR) is achievable by system 10. Depending upon implementation of deflectors 12, 16, the total FOR may exceed +/−50 or even 60 degrees. See also FIG. 4.

It should be apparent that electronics 26 may operate automatically, without user command, or be computerized to function independently, so that system 10 is programmable, for example, to temporally steer beam 18 to desired positions within the FOR. This is for example useful when beam 18 derives from a source such as a laser 32 and the scan pattern of beam 18" within the FOR is known a priori. Accordingly, system 10 may operate under control of software 27 (or firmware), described further in connection with FIG. 5.

Figure 2:
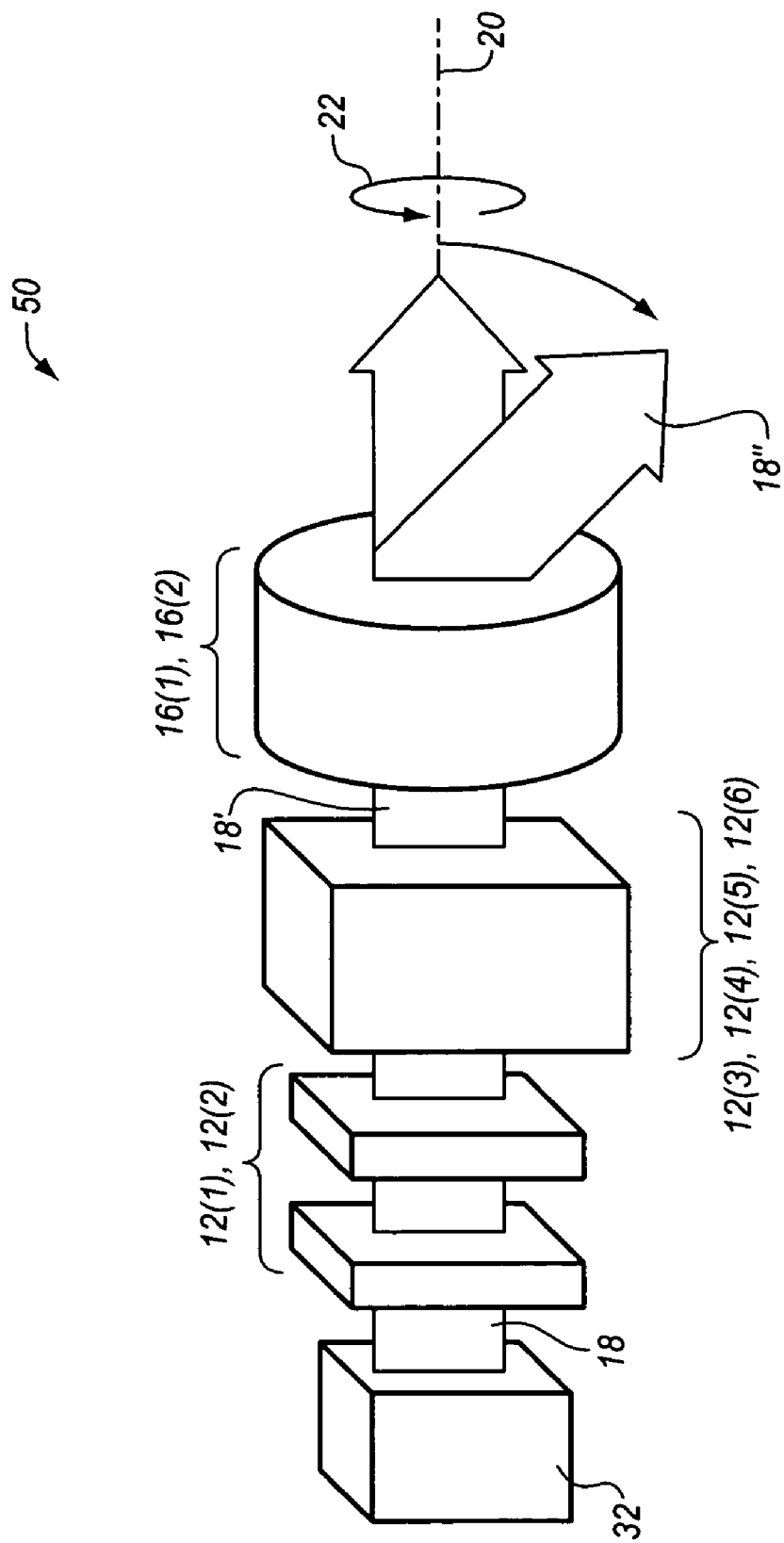
FIG. 2 shows a functional view of one electro-optomechanical beam steering system.

FIG. 2 shows a functional diagram of an electro-optomechanical beam steering system 50. System 50 is shown with source laser 32 emitting laser radiation that forms optical beam 18 along a boresight 20. A pair of transmissive liquid crystal optical phased arrays (LC OPAs) 12(1), 12(2) provide fine angle (e.g., about one degree) deflection of optical beam 18 for input to deflectors 12(3), 12(4), 12(5), 12(6). An output beam 18' from deflectors 12(3), 12(4), 12(5), 12(6) is input to a pair of polar angle deflectors 16(1), 16(2) that rotate in azimuth, illustrated by arrow 22. Positioning of polar angle deflectors 16(1)(2) in azimuth may be accomplished by a motor (not shown; see, e.g., stage 14, FIG. 1). The output from polar angle deflectors 16(1), 16(2) is a beam 18" that may be positioned (i.e., deflected in polar) within the FOR, selectively, according to control signals applied to LC OPAs 12(1)(2), deflectors 12(3), 12(4), 12(5), 12(6), polar angle deflectors 16(1), 16(2) and the motor.

Electro-optomechanical beam steering system 50 is thus similar to beam steering system 10, FIG. 1. LC OPAs 12(1), 12(2) and deflectors 12(3), 12(4), 12(5), 12(6) collectively operate like first deflector 12, while polar angle deflectors 16(1), 16(2) operate like second deflector 16 (when azimuthally positioned by a motor operating as rotation stage 14).

Figure 3:
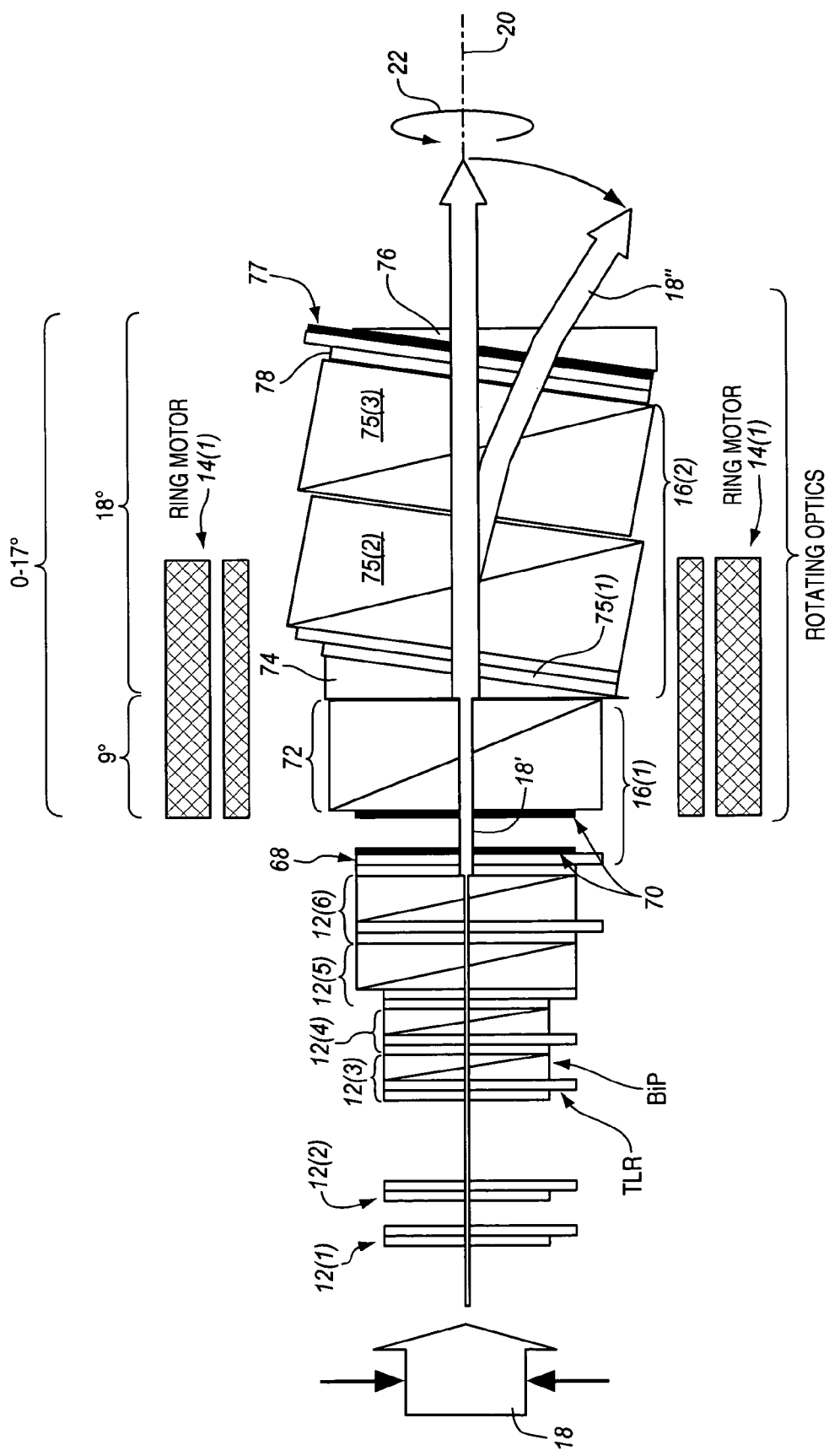
FIG. 3 shows an embodiment of the electro-optomechanical beam steering system of FIG. 2.

FIG. 3 shows exemplary detail of an embodiment of system 50. As before, optical beam 18 is shown entering the system along a boresight 20. LC OPAs 12(1), 12(2) serve to deflect beam 18 in x, y, respectively, providing, for example, 1.125 degrees of continuous x,y deflection. See also FIG. 4. Four electro-optic stages 12(3), 12(4), 12(5), 12(6) then further deflect the beam in x and y, to produce an output beam 18'. Each stage 12(3), 12(4), 12(5), 12(6) has a TLR and a birefringent prism, as shown, and may be configured to one-dimensionally (i.e., x or y) deflect the optical beam up to an additional 3.375 degrees, for example. The output from stages 12(3), 12(4), 12(5), 12(6) is beam 18'. In the embodiment of FIG. 3, an exit TLR 68 and a birefringent prism 72 together form the first polar angle deflector 16(1), FIG. 2; TLR 68 is mounted outside of the rotation stage to avoid using an additional slip-ring based electrical connection, though mounting of TLR 68 within the rotation stage is contemplated by the present disclosure. Two quarter waveplates 70 ensure that the polarization couples correctly from the stationary electro-optical deflector (stages 12(1)-12(6)) to the rotation stage, which houses stages 16(1), 16(2) (a pair of glass prisms 74 and 76 may be used to ensure that stage 16(2) is optimally oriented). Stage 16(2) has one TLR 75(1) and two birefringent prisms 75(2), 75(3), as shown, to provide large deflection. An exit TLR 78 maintains constant exit polarization for all deflection states. The primary source of crosstalk or sidelobes is imperfect polarization rotation of TLRs, which results in sidelobes that have a polarization orthogonal to the exit beam; and thus a reflective polarizer 77 improves crosstalk suppression.

In an embodiment, entrance birefringent prism 72 serves to deflect beam 18' from 0-9 degrees; polar angle deflectors 16(1), 16(2) may further deflect the beam by an additional eighteen degrees for a total of approximately twenty-seven degrees, as illustrated. Thus the output polar angle deflection of output beam 18" can be anywhere from 0 degrees (i.e., undeflected along boresight 20) up to about twenty-seven degrees.

It should be noted that the order of one dimensional deflections (x, y or y, x) in FIG. 3 is not particular and can be in various orders without departing from the scope hereof.

Each OPA 12(1), 12(2) may be manufactured with known techniques, such as with a tunable grating that adjusts the beam's direction by diffraction. In one example, the OPA may include a first piece of glass with striped electrodes on its surface, and another piece of glass coated with a transparent conductor; this creates a cell structure that is filled with liquid crystal material and controlled with applied electrical signals to deflect optical beam 18.

Figure 4:
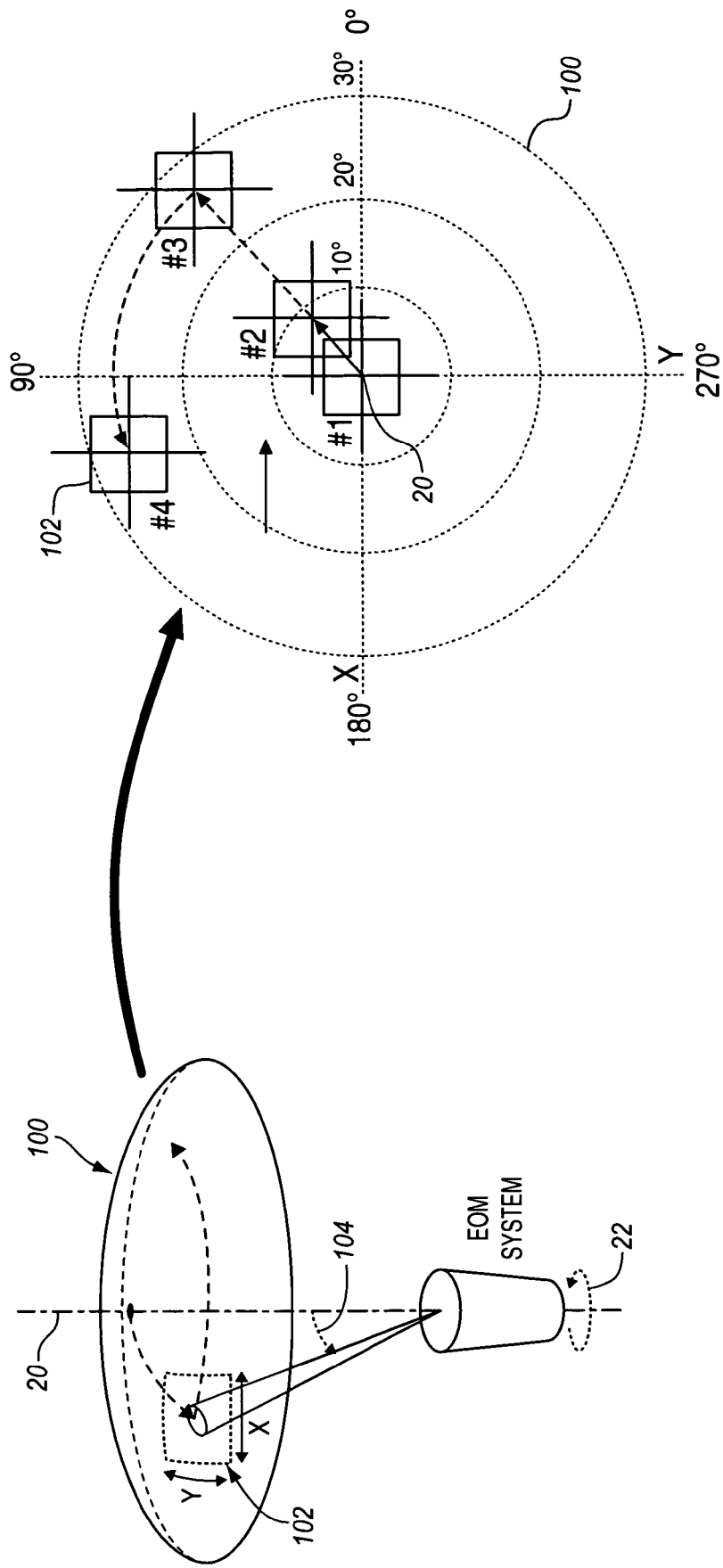
FIG. 4 illustrates the field of regard (FOR) that may be obtained by the system of FIG. 3.

FIG. 4 illustrates the field of regard (FOR) 100 which may be achieved by the system illustrated in FIG. 3 but without OPAs 12(1), 12(2). X-Y window 102 thus illustrates maximum deflections from electro-optical deflectors 12(3), 12(4), 12(5), 12(6); adding OPAs 12(1), 12(2) would extend this window over another degree. Deflection from polar angle deflectors 16(1), 16(2) is shown by angle 104, which depends upon azimuth as positioned by the drive motor of the rotational stage. Thus, the motor and deflectors 12(1), 12(2) collectively position the rectangular window of the first electro-optic deflector in a circular angle window centered about the boresight 20, as shown. The FOR 100 for this example extends above 60 degrees.

Illustratively, FIG. 4 shows #1, #2, #3, #4 that represent a sequence of deflections in which only the motor and the polar deflectors mounted on the motor are engaged. The square window for each #1, #2, #3, #4 represents first field of regard $\Omega_1$, FIG. 1 (i.e., the field of regard for the stationary deflectors). This window 102 is moved around in this example. More particularly, #1 is when motor rotation is zero and polar deflectors also point to zero degrees (boresight); #2 is when the motor rotates to +45 degrees and polar deflectors deflect the beam by 9 degrees; #3 is the same motor position as #2 but the polar deflectors deflect to 27 degrees; to move from #3 to #4, only the motor is used (it rotates from +45 degree azimuth to ~+110 degree azimuth).

There may therefore be several uses of the electro-optomechanical beam steering systems thus described. They might for example be used in industrial scan applications to cut metal or glass, in free space communication applications to carry data over remote nodes, in laser display applications, in CD or DVD write systems, in remote detection or imaging applications, and as a free space connector or a switch between fiber optics, for example.

Figure 5:
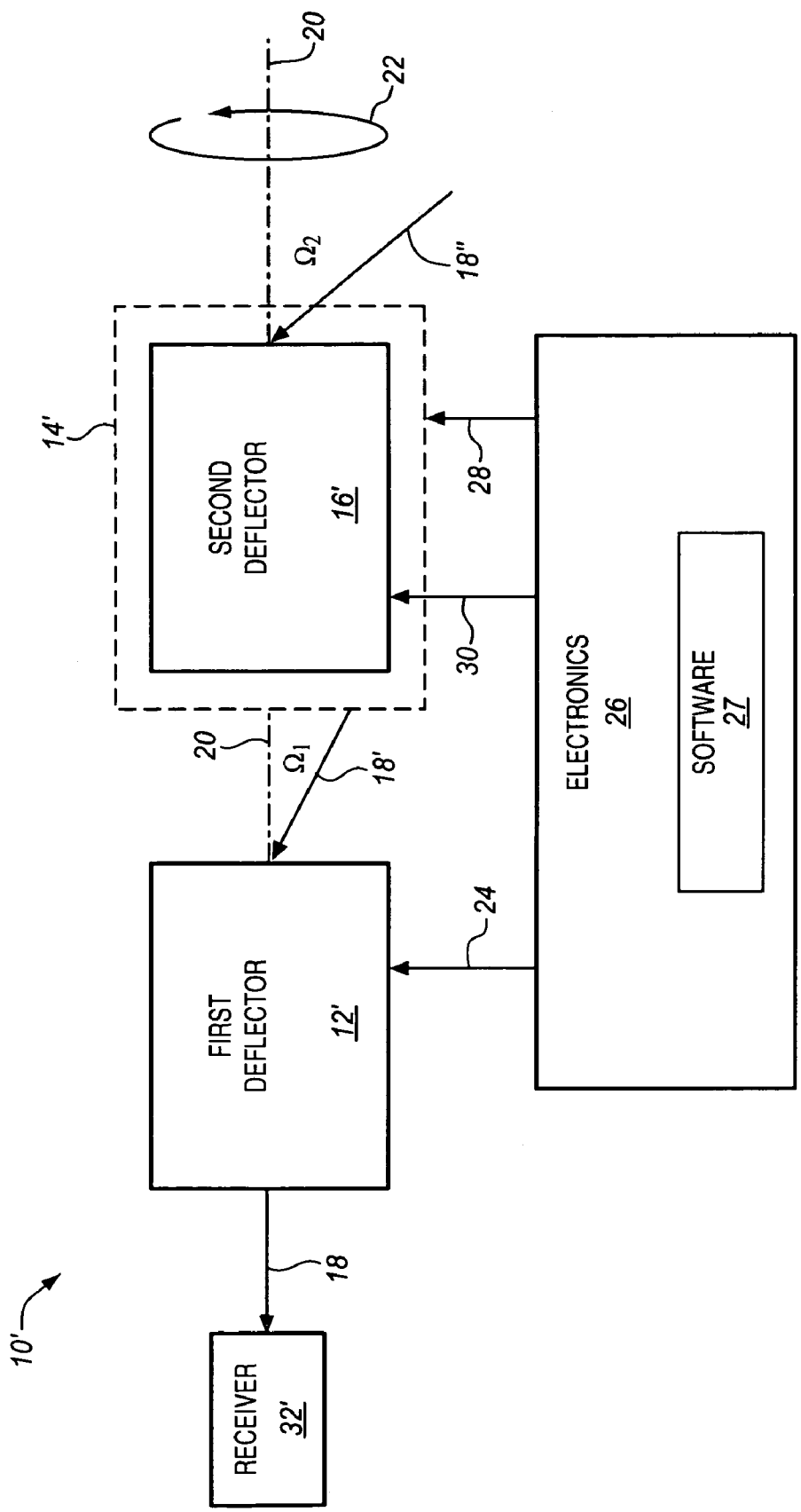
FIG. 5 illustrates an optical sensing system.

It should be apparent that the electro-optomechanical beam steering systems described herein can operate in reverse, to sense a source of radiation within the FOR and detect that source at a receiver (e.g., a detector). FIG. 5 thus illustrates this reverse operation as system 10'. An incoming optical beam 18 of FIG. 5 derives from an optical source in the FOR. When rotation stage 14' positions second deflector 16' appropriately in azimuth, that beam 18 is deflected by second deflector 16' as optical beam 18'. First deflector 12' deflects incoming beam 18' to the optical axis 20, which aligns with a receiver 32'. In this manner, therefore, system 10' may detect optical sources in the FOR. Control signals 24, 28, 30 from electronics 26 may for example serve to continuously scan the FOR for such sources, by adjusting deflection properties of first and second deflectors 12', 16' and positioning of azimuth by rotation stage 14'. When a source is detected, it may then be tracked by system 10'; and the source position is known since deflection and azimuth may be calibrated and thereby known for all signals 24, 28, 30 in the FOR.

Figure 6:
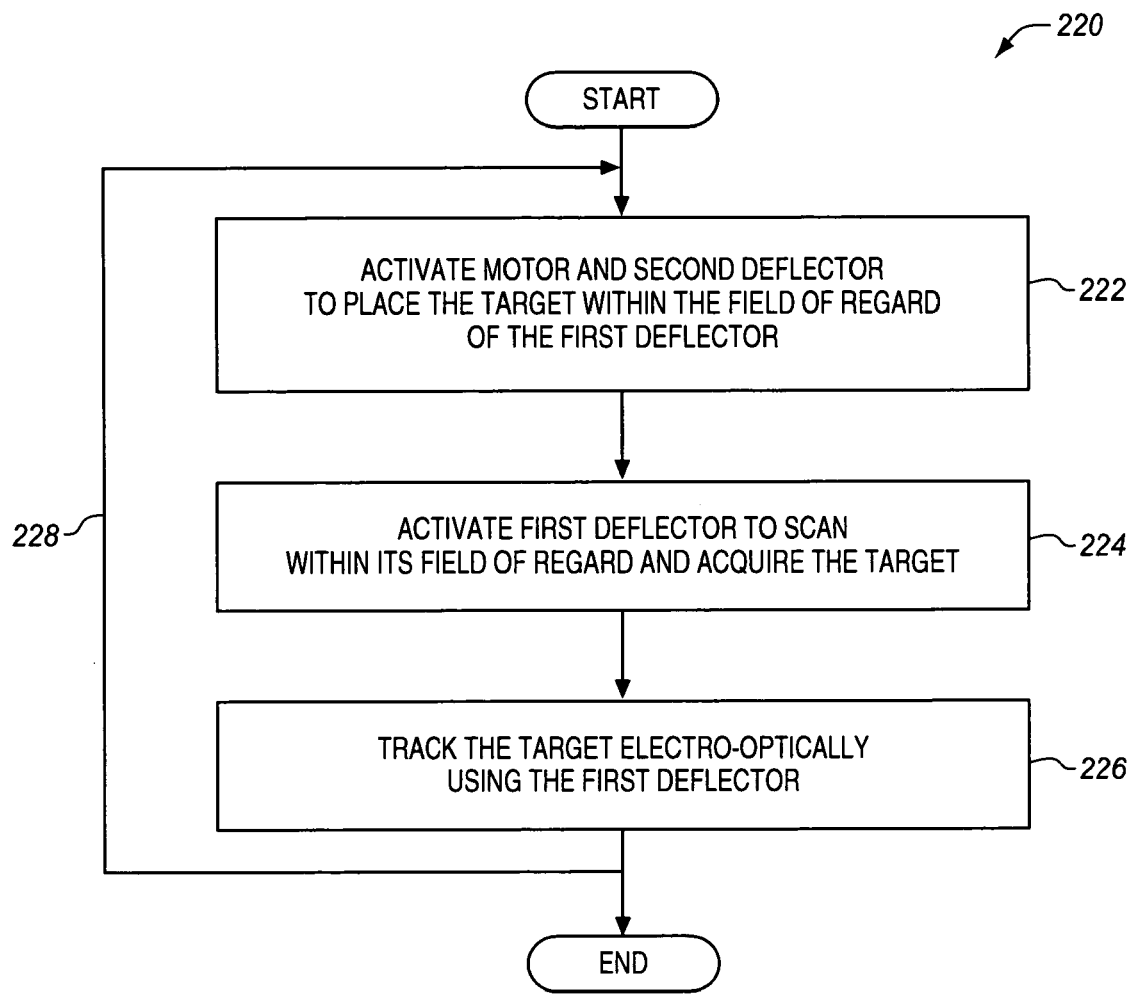
FIG. 6 shows a flowchart of one process to control an electro-optomechanical beam steering system used in targeting, in accord with an embodiment.

FIG. 6 shows a process 220 that may be utilized to control and operate an electro-optomechanical system 10' in a targeting application. Process 220 is for example useful when you know where a target is within some coordinate certainty in the field of regard, and then the goal is to track the target. Process 120 may be implemented by electronics 26 under control of software 27, or similarly by software 27 providing instructions for a computer processor as electronics 26. In step 222, therefore, the motor and the second deflector are activated to place the target within the field of regard of the first deflector. The first deflector is then activated to scan within its field of regard to acquire (lock on) the target, in step 224. In step 226, the target is then tracked electro-optically via the first deflector. Process 220 may repeat, as indicated by arrow 228. Step 222 may be enhanced, for example, by controlling the motor and, periodically, the second deflector such that the target remains in the center of the electro-optic window provided by the first deflector.

Changes may be made to this application without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. An electro-optomechanical beam steering system, comprising:
   a first deflector having a first configuration for selectively deflecting an optical beam in a first field of regard centered about a boresight, the first deflector being stationary and non-rotatable;
   a rotation stage having a second deflector with a second configuration different from the first configuration, the rotation stage including a motor to selectively rotate the second deflector in azimuth about the boresight, the second deflector selectively deflecting the optical beam of the first field of regard in a second field of regard along a polar angle defined by the second deflector and an azimuthal angle as positioned by the rotation stage.

2. The system of claim 1 wherein the first deflector includes an electro-optic or an electro-mechanical deflector, and the second deflector includes an electro-optic deflector.

3. The system of claim 1, wherein the first deflector comprises a multistage x-y electro-optic deflector responsive to electrical signals to deflect the optical beam within the first field of regard.

4. The system of claim 3, wherein the multi-stage x-y electro-optic deflector is configured to deflect the optical beam from the boresight to within the first field of regard up to about 10 degrees from the boresight.

5. The system of claim 3, wherein each stage of the multistage x-y deflector is operable to deflect the optical beam in one dimension in response to the electrical signals.

6. The system of claim 5, wherein each stage of multi-stage deflector comprises a birefringent prism and a tunable liquid crystal polarization rotator.

7. The system of claim 1, wherein the first deflector includes two liquid crystal optical phased arrays.

8. The system of claim 7, wherein the optical phased arrays are operable for continuous deflection of the optical beam of up to about ±2 degrees from the boresight.

9. The system of claim 7, wherein the first deflector comprises a multistage x-y electro-optic deflector responsive to electrical signals to deflect the optical beam within the first field of regard, the optical phased arrays and the multi-stage x-y deflector cooperating to deflect the optical beam up to about +/−4.5 degrees from the boresight.

10. The system of claim 1, wherein the first deflector includes a voice coil or piezoelectric fine steering mirror.

11. The system of claim 10, wherein the fine steering mirror is operable for continuous deflection of the optical beam of up to about +/−2 degrees from the boresight.

12. The system of claim 10, wherein the first deflector comprises a multistage x-y electro-optic deflector responsive to electrical signals to deflect the optical beam within the first field of regard, the fine steering mirror and the multi-stage x-y deflector cooperating to deflect the optical beam up to about +I-4.5 degrees from the boresight.

13. The system of claim 1, wherein the second electro-optical deflector comprises a multi-stage polar angle deflector responsive to electrical signals to deflect the optical beam within the second field of regard.

14. The system of claim 13, wherein the multi-stage polar angle deflector includes a two-stage polar angle deflector configured to deflect the optical beam from the polar axis by approximately 0, 9, 18, or 27 degrees.

15. The system of claim 13, wherein each stage of the multi-stage polar angle deflector is operable to deflect the optical beam in one dimension in response to the electrical signals.

16. The system of claim 13, wherein each stage of the multi-stage polar angle deflector comprises a birefringent prism and a tunable liquid crystal polarization rotator.

17. The system of claim 1, further comprising two quarter wave plates configured to couple appropriate polarization of the optical beam from the first electro-optical deflector to the rotation stage.

18. The system of claim 1, further comprising a tunable liquid crystal polarization rotator configured at an output of the rotation stage, for maintaining constant exit polarizations.

19. An electro-optomechanical beam steering system comprising:
a first deflector comprising a tunable component responsive to an electrical signal for selectively deflecting an optical beam in a first field of regard centered about a boresight; and
a rotation stage having a second deflector, the rotation stage selectively positioning the second deflector in azimuth about the boresight, the second deflector selectively deflecting the optical beam of the first field of regard in a second field of regard along a polar angle defined by the second deflector and the azimuthal angle as positioned by the rotation stage, the rotation stage comprising a motor for rotating the second deflector in azimuth, and the motor comprising a ring motor operable to rotate polar angle deflectors of the second deflector.

20. The system of claim 1, wherein the first and second deflectors and the rotational stage cooperate to provide a total field of regard up to about 90 degrees.

21. The system of claim 1, further comprising an exit tunable liquid crystal polarization rotator that maintains constant exit polarization for all deflection states.

22. The system of claim 1, further comprising a polarizer for suppressing cross-talk.

23. A method for steering an optical beam, comprising:
applying first control signals to a tunable component of a first deflector, the tunable component being responsive to the first control signals to selectively deflect an optical beam within a first field of regard centered about a boresight;
commanding a motor to rotate a second deflector about the boresight; and
applying second control signals to the second deflector to selectively deflect the optical beam of the first field of regard within a second field of regard in a direction, away from the boresight, defined by polar deflection of the second deflector and azimuthal direction defined by the rotation of the motor.

24. The method of claim 23, wherein the applying first control signals includes applying signals to at least one optical phased array.

25. The method of claim 23, wherein the applying first control signals includes applying signals to at least one fine steering mirror.

26. The method of claim 23, wherein the applying first control signals includes applying signals to at least one stage having a birefringent prism and a tunable liquid crystal polarization rotator.

27. The method of claim 26, wherein the applying first control signals includes applying signals to at least two stages, each stage deflecting the optical beam in one dimension.

28. The method of claim 24, wherein the commanding the motor includes rotating the second deflector in azimuth about the boresight.

29. The method of claim 23, wherein the applying second control signals includes applying signals to at least one stage having a birefringent prism and a tunable liquid crystal polarization rotator.

30. The method of claim 29, wherein the applying second control signals includes applying signals to at least two stages, each stage deflecting the optical beam in one dimension.

31. The method of claim 23, further comprising modifying polarization of electro-magnetic energy between the first deflector and the second deflector.

32. The method of claim 31, wherein the modifying includes utilizing at least one quarter wave plate.

33. The method of claim 23, further comprising modifying polarization exiting the second deflector with a tunable liquid crystal polarization rotator, to maintain a constant polarization of electro-magnetic energy exiting the second deflector.

34. The method of claim 23, further comprising suppressing cross-talk using a polarizer.

35. A software product comprising instructions, stored on computer-readable media, wherein the instructions, when executed by a computer, perform steps comprising:
applying first control signals to a tunable component of a first deflector, the tunable component being responsive to the first control signals, thereby deflecting the optical beam within a first field of regard centered about a boresight;
commanding a motor to rotate a second deflector, thereby selectively repositioning the deflected optical beam of the first field of regard in azimuth; and
applying second control signals to the second deflector, thereby selectively deflecting the optical beam of the first field of regard away from boresight and within a second field of regard centered about boresight.

* * * * *